Figure 1:
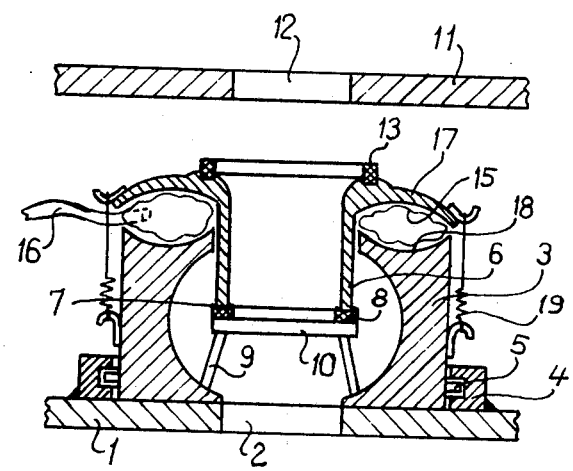

United States Patent [19]

Lundberg

[11] 4,124,046
[45] Nov. 7, 1978

[54] CONNECTING DEVICE FOR INTERMITTENT AIR FLOW

[75] Inventor: Knut A. L. Lundberg, Norrkoping, Sweden

[73] Assignee: Stal Refrigeration AB, Norrkoping, Sweden

[21] Appl. No.: 733,247

[22] Filed: Oct. 18, 1976

[30] Foreign Application Priority Data

Oct. 16, 1975 [SE] Sweden ............................ 7511600

[51] Int. Cl.² ............................................. B65B 3/04
[52] U.S. Cl. .................................. 141/287; 141/312; 141/383; 285/9 R
[58] Field of Search ............... 141/346, 287, 312, 383, 141/311; 251/61.2; 285/9 R

[56] References Cited

U.S. PATENT DOCUMENTS 3,689,047  9/1972  Grosko .................................. 141/287

*Primary Examiner*—Houston S. Bell
*Attorney, Agent, or Firm*—Cyrus S. Hapgood

[57] ABSTRACT

A tubular element of a connecting device is mounted for displacement between an extended position, where it seals against a mobile container around an opening therein for passage of conditioning air, and a retracted position where it is spaced from the container and where the connecting device is entirely retracted from said opening. A valve arrangement of the connecting device includes a body disposed coaxially of the tubular element and forming therewith a passage for the air flow which is opened when said element moves toward its extended position and which is closed when said element moves toward its retracted position.

3 Claims, 2 Drawing Figures

U.S. Patent

Nov. 7, 1978

4,124,046

CONNECTING DEVICE FOR INTERMITTENT AIR FLOW

The present invention relates to a stationary device, especially in ships, for connecting an opening of a mobile container to an air conditioning system so that conditioning air can be conducted to or from the container. The connecting device comprises a tubular element arranged to be displaced, substantially coaxially with the opening, between an extended position where the tubular element seals around the opening, and a retracted position where the tubular element is at a distance from the opening and where the connecting device as a whole is retracted from the opening, and a valve arrangement which makes way for the conditioning air through the tubular element when the latter is in the extended position and shuts off the flow of conditioning air through the tubular element when the latter is in the retracted position.

Such connecting devices are used in ships which transport containers treated by conditioned air (e.g., cooled by cold air), each container being connectable to a cold air aggregate by two connecting devices, one of which supplies cold air to the container and the other of which brings return air from the container back to the cold air aggregate.

The connecting devices are arranged in vertical rows in the hold of the ship, and the containers are stacked upon each other, guided by vertical guides, so that their cold air openings are situated in front of the connecting devices. The connecting devices must not be damaged when the containers are lowered into or lifted from the hold. Therefore, the connecting devices have been arranged to take a retracted position when they are not connected to a container. A free horizontal distance of about 100 mm. between the connecting device and the container is considered necessary to allow movement of the container vertically relative to the connecting device without the connecting device being damaged. In order not to waste any cold air, the connecting device has been provided with a valve for shutting off the cold air communication through the connecting device when it is not connected to a container.

A connecting device of the above-noted kind is disclosed in the prior art. This prior connecting device comprises one stationary tubular element and one tubular element which is movable towards the container, the elements being interconnected by a bellows means. A butterfly valve is rotatably journalled in the movable tubular element. When the movable tubular element is pushed out, the butterfly valve is automatically opened by a mechanism arranged between the tubular elements. This prior connecting device has a complicated structure and is therefore expensive to produce. It is significant in this connection that a ship for transporting cooled containers today can load up to 1000 containers, for which 2000 connecting devices are required.

Another prior connecting device is disclosed in the French Pat. No. 69.37099. This prior connecting device comprises an inflatable ring which, on being inflated, expands toward the container and into sealing contact around its cold air opening. The structure is simple, but it lacks a valve for shutting off the cold air flow.

Moreover, the prior art also discloses a valve having a certain similarity to the connecting device of the present invention and in which a fluid flow is intended to pass through a tubular element arranged for axial movement in a valve housing. The fluid flow is shut off by displacing the tubular element toward a stationary body so that the latter closes the end of the tubular element. However, the valve as a whole is not retractable, and the valve cannot be used together with a container without being damaged when the container is moved transversely relative to the valve.

An object of the present invention is to provide an improved connecting device of the above-noted kind which overcomes these disadvantages of the prior devices.

In a connecting device made according to the invention, the valve arrangement comprises a body arranged in coaxial relationship with the tubular element and forming therewith a passage for the air flow, the passage being opened and closed through relative axial motion between the tubular element and the body. The passage is opened when the tubular element moves toward the extended position and is shut off when the tubular element is moved toward the retracted position.

Compared to a previously mentioned connecting device of the prior art, where a relative movement between a movable tubular element and a stationary tubular element is used for obtaining a turning movement of a butterfly valve rotatably journalled in the movable tubular element, the connecting device of the present invention is structurally much simpler, since it uses the axial movement of the movable tubular element directly to shut off the air flow through the connecting device. Compared to the connecting device according to the French Pat. No. 69.37099, the necessary valve for shutting off the air flow is obtained through the invention.

Figure 2:
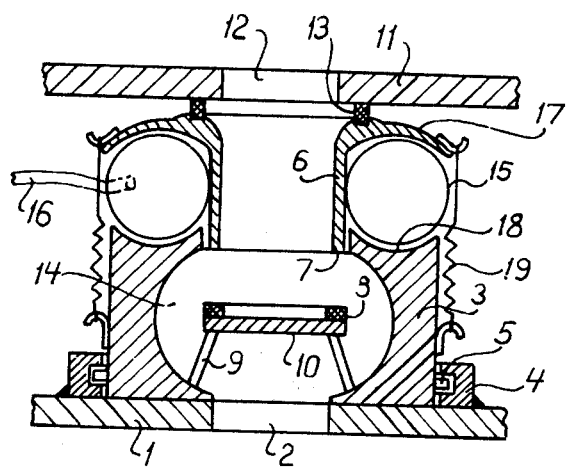

An embodiment of a connecting device according to the invention is described below with reference to the accompanying drawing, in which FIG. 1 is a longitudinal sectional view of the connecting device showing the cold air passage shut off and with the free end of the device located at a distance from the cold air opening of a container, and FIG. 2 is a view similar to FIG. 1 but showing the connecting device connected to the container.

As shown in the drawing, a stationary wall 1 is arranged in the hold of a ship. In the wall 1 is an opening 2 which communicates with a refrigeration system (not shown) for supplying cooled air to the opening 2 or for discharging air from the opening 2. A collar 3 is fastened around the opening 2 by means of a bayonet coupling comprising a ring 4 fastened to the wall 1 and cooperating with pins 5 protruding from the collar 3.

A tubular element 6 is journalled in the collar 3 for displacement between a retracted position (FIG. 1) and an extended position (FIG. 2). In the retracted position, the end 7 of the tubular element 6 seals against an elastic sealing ring 8 of a body 10 which is arranged centrally in the collar 3 by means of legs 9, thereby preventing air from flowing through the opening 2.

At a distance from the tubular element 6 shown in FIG. 1 there is a wall 11 of a container coolable by cold air. In the wall 11 is an opening 12 for supplying cold air to the container or for discharging air from the container.

The opening 2 is brought into communication with the opening 12 by extending the element 6 toward the wall 11, whereby the element 6 makes sealing contact with the wall 11 by means of an elastic sealing ring 13 surrounding the opening 12, while the element 6 with its end 7 withdraws from the body 10 and thus opens a passage 14 for the cold air.

The element 6 is operated by means of a rubber ring 15 which is inflatable through a tube 16. The ring 15, which surrounds the element 6, is arranged between an annular radial flange 17 of the element 6 and an annular surface 18 of the collar 3. When the ring 15 is inflated, the element 6 is displaced to its extended position (FIG. 2). When the ring 15 is deflated, springs 19 pull the element back into sealing contact with the body 10. The springs 19 are connected at their opposite ends to the flange 17 and the collar 3, respectively.

Although the rubber ring 15 constitutes a simple means for operating the element 6, the latter can be operated in another way, as by pneumatic cylinders. Also, although the valve arrangement 7, 8, 10 of the seat type is advantageous due to its simplicity, it can be replaced by a valve arrangement of the slide type, as by providing the body 10 with a tubular part which telescopes into the element 6 and has ports cooperating with ports in the element 6.

I claim:

1. In combination with a mobile container having an opening for passage of conditioning air, and a wall forming a port for supplying said conditioning air, a connecting device for alternately establishing and breaking fluid communication between said opening and said port, said device comprising a collar attachable to said wall around said port, a separate body forming a sealing surface, a tubular element displaceable in the collar substantially coaxially of said opening between an extended position, where one end of said element seals around said container opening and the other end of said element is spaced from said sealing surface, whereby an air passage is formed between said other end and said sealing surface, and a retracted position where said one end is spaced from said container opening and said other end seals against said sealing surface, whereby flow of conditioning air through the tubular element is cut off, and legs connecting said separate body to said collar and forming flow paths between said legs, said paths allowing the conditioning air to pass between said port and said air passage.

2. The combination of claim 1, in which said body is substantially immovable relative to said collar.

3. The combination of claim 1, comprising also a ring surrounding said tubular element, said ring being inflatable to move the tubular element to said extended position, and spring means for returning the tubular element to said retracted position when the ring is deflated.

* * * * *